United States Patent [19]

Maeda

[11] Patent Number: 4,851,323
[45] Date of Patent: Jul. 25, 1989

[54] OPTICAL INFORMATION RECORDING CARD USING POLYMER BLEND AS RECORDING MATERIAL

[75] Inventor: Kazuhiko Maeda, Tokyo, Japan

[73] Assignee: Central Glass Company, Limited, Ube, Japan

[21] Appl. No.: 13,944

[22] Filed: Feb. 12, 1987

[30] Foreign Application Priority Data

Feb. 13, 1986 [JP]  Japan .................................. 61-27910

[51] Int. Cl.$^4$ ........................ G01D 15/34; G03C 1/94; G03C 1/72
[52] U.S. Cl. .................................... 430/275; 430/270; 430/290; 430/944; 430/945; 428/421; 346/76 L; 346/135.1
[58] Field of Search ............... 430/944, 945, 270, 275, 430/290; 428/421; 346/76 L, 35.1

[56] References Cited

U.S. PATENT DOCUMENTS

| | | | |
|---|---|---|---|
| 4,141,873 | 2/1979 | Dohany | 428/421 X |
| 4,357,616 | 11/1982 | Terao et al. | 346/135.1 |
| 4,463,083 | 7/1984 | Kitajima et al. | 430/273 |
| 4,598,393 | 7/1986 | Pierce et al. | 369/46 |
| 4,711,996 | 12/1987 | Drexler | 346/76 L X |

FOREIGN PATENT DOCUMENTS

| | | | |
|---|---|---|---|
| 61-102248 | 5/1986 | Japan | 346/135.1 |
| 1060672 | 3/1967 | United Kingdom . | |
| 1235537 | 6/1971 | United Kingdom . | |

OTHER PUBLICATIONS

"Optical Recording of Refractive-Index Patterns in Doped Poly-(Methylmethacrylate") Films, by H. Franke, vol. 23, #16, Applied Optics, 8/15/84.

Primary Examiner—Paul R. Michl
Assistant Examiner—Cynthia Hamilton
Attorney, Agent, or Firm—Fleit, Jacobsen, Cohn & Price

[57] ABSTRACT

The invention relates to an information recording card using a semiconductor laser beam for writing and reading information. The card has a recording layer formed on a card substrate so as to closely cover at least a selected surface area of the substrate and may have a reflective metal layer on the back side of the recording layer. The material of the reacording layer is a polymer blend which exhibits phase transition and resultant changes in light transmittance and reflectance by heating and which is either a binary polymer blend of a vinylidene fluoride (VDf) base polymer, either PVDF or a copolymer of VDF and another F-containing monomer such as TFE, and an acrylic or methacrylic polymer represented by PMMA or a ternary copolymer comprising a vinyl ester polymer in addition to the components of the binary polymer blend. The thermally caused phase transition is reversible by slow cooling in the case of the binary polymer blend but is irreversible in the case of the ternary polymer blend.

19 Claims, 1 Drawing Sheet

OPTICAL INFORMATION RECORDING CARD USING POLYMER BLEND AS RECORDING MATERIAL

BACKGROUND OF THE INVENTION

This invention relates to an optical information recording card using a polymer blend as the recording material in which digital information can be thermally written by a semiconductor laser beam.

With the rapid advance of semiconductor lasers in recent years, much vigorous efforts have been devoted to the development of optical information recording discs and cards using a thermal mode recording material. In the thermal mode recording, information is input in the form of heat energy and is recorded and read by utilizing a change in a physical property or state of the recording material, such as a magnetic change, photochromic change or phase transition. For some purposes information storage systems of this category have already been put into practical use.

Well known thermal mode recording materials are some alloys or intermetallic compounds which are fundamentally composed of Al, Ten-key, Bi, Set, Tb, Co, Fe and/or In. Besides, there are proposals for use of organic pigments of cyanine type, use of a colloidal organic material in which silver particles are dispersed or use of a metal salt for precipitation of a metal by electroless plating. A typical method for recording information is forming tiny pits in the recording layer by utilizing thermal deformation of the recording material. Also it is known to write and read information by utilizing a thermally caused phase transition of the recording material from a noncrystalline state to a crystalline state and/or vice versa. Usually a semiconductor laser beam is employed as the heating means for recording information. The laser beam is focussed to a very small spot on the recording layer surface and is guided so as to digitally and one-dimensionally write information into the recording layer.

As to the aforementioned metallic recording materials, a disadvantage is that most of the essential metals have toxicity and, hence, have to be handled with great care. This becomes a particularly serious matter of concern in the cases of information recording cards with which human bodies very frequently make direct contact. Besides, the metallic recording materials are liable to oxidation or some corrosion and do not possess good storability. At present these shortcomings are coped with by providing a protective film on the recording layer of each recording medium. Nevertheless, the recording layer gradually deteriorates by oxidation or partial corrosion and consequently becomes low in recording sensitivity and/or reading sensitivity. From an economical point of view, high cost of equipment for vapor deposition or sputtering of the metallic recording materials is also an important consideration.

Nonmetallic optical information recording materials have not yet proved to be practicable and sufficiently stable.

SUMMARY OF THE INVENTION

It is an object of the present invention to provide an optical information recording card in which information can be thermally written by a semiconductor laser beam and in which the recording layer is formed of a nontoxic and long stable nonmetallic material.

According to the invention there is provided an optical information recording card which comprises a card substrate and a recording layer formed on one side of the card substrate so as to closely cover at least a selected surface area of the card substrate and which is characterized in that the recording layer is formed of a polymer blend comprising a vinylidene fluoride base polymer as a first component and an acrylic or methacrylic ester polymer as a second component.

The polymer blend employed in this invention exhibits phase transition and resultant changes in light transmittance and reflectance when heated, for example, by a semiconductor laser beam. Accordingly information can be written into the recording layer by a semiconductor laser beam. The written information is erasable and the recording layer is overwritable when the polymer blend is a binary polymer blend of the above specified first and second components, because the phase transition of the binary polymer blend is reversible by slow cooling.

The polymer blend as the recording material may be a ternary polymer blend comprising a vinyl ester polymer in addition to the above specified first and second components. In this case the thermally caused phase transition of the polymer blend is irreversible, and therefore the recording card can be used as an inerasably writable type memory. Besides, the ternary polymer blend becomes higher in writing sensitivity and will become lower in material cost.

In every case the polymer blend employed in the invention is nontoxic and is long stable.

An optical information recording card according to the invention can easily be produced by forming the recording layer on the card substrate surface by applying a solution of the polymer blend or by bonding a sheet of the polymer blend to the card substrate by a suitable method such as pressure welding, heat welding or cementing.

DESCRIPTION OF THE PREFERRED EMBODIMENTS

Figure 1:
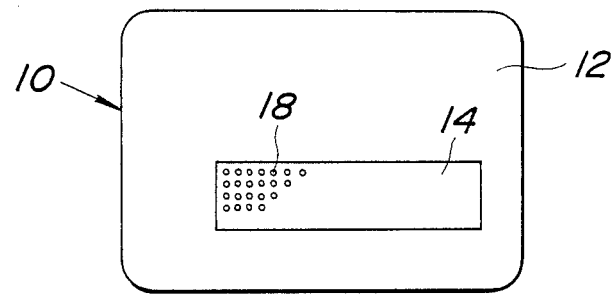
FIGS. 1 and 2 are schematic plan and sectional views of an optical information recording card according to the invention, respectively.

In a polymer blend used in this invention the first component is a vinylidene fluoride (VDF) base polymer, which is either homopolymer of VDF or copolymer of VDF and at least one comonomer. It is suitable to select the comonomer(s) from fluoro-compounds such as trifluoroethylene, tetrafluoroethylene, hexafluoroacetone, hexafluoroisobutene, chlorotrifluoroethylene, hexafluoropropene and vinyl fluoride. Usually a binary copolymer or a ternary copolymer is used, and in every case VDF should occupy 10 to 99 mol % of the copolymer.

The second component of the polymer blend is an acrylic or methacrylic ester polymer which may be either a homopolymer or a copolymer. Preferably the acrylic or methacrylic monomer is selected from methyl acrylate or methacrylate, ethyl acrylate or methacrylate, n-propyl acrylate or methacrylate and n-butyl acrylate or methacrylate.

In blending the first and second polymer components, the proportion of the first component to the second component is widely variable within the range from 5:95 to 99:1 by weight.

Heating of a binary polymer blend of the above described first and second components causes slight phase separation between the two polymer components and results in a decrease in the light transmittance, and an increase in the reflectance, of the polymer blend. Such changes in the optical characteristics can be fixed by rapid cooling. Also it is possible to restore the decreased transmittance and increased reflectance to the initial levels by slow cooling. Therefore, it is possible to write information into a layer of the polymer blend by using a laser beam, and the written information can be either stored or erased by selecting the mode of cooling.

A ternary polymer blend useful as the recording material in the present invention is obtained by blending a vinyl ester polymer together with the above described first and second components. The vinyl ester polymer employed as the third component is a polymer of a vinyl ester of an aliphatic carboxylic acid such as vinyl acetate, vinyl propionate, vinyl butyrate, vinyl caproate, vinyl caprylate, vinyl caprate, vinyl laurate or vinyl stearate. The amount of the third component is up to 70 wt% of the total of the first and second components. Heating of the ternary polymer blend causes an irreversible phase transition which is accompanied by changes in light transmittance and reflectance. Therefore, information thermally written into a layer of this ternary polymer blend cannot be erased.

A binary or ternary polymer blend for use in this invention can be prepared and shaped into a film or sheet form by using conventional methods for blending and shaping of conventional thermoplastic resins. For example, the two or three kinds of polymers are blended and kneaded under appropriate heating in a conventional mixer such as Henschel mixer, V-type blender, ribbon blender, planetary mixer or rolls, and the obtained polymer blend is shaped into a sheet form by extrusion, injection molding, calendering or press-shaping. A solution coating or solution casting method is also practicable and is rather advantageous for obtaining a uniformly thin sheet or film of the desired polymer blend. In this method blending of the raw material polymers is accomplished by dissolving all the polymers in an organic solvent common to the raw material polymers. A suitable solvent can be selected, for example, from esters, ketones and cyclic ethers.

In preparing a desired polymer blend a coloring agent may optionally be added for the purpose of enhancing the efficiency of absorption of a semiconductor laser light. As the coloring agent an organic dye or pigment is preferable because of good dispersibility.

An optical information recording card according to the invention is produced by forming a thin layer of the above described polymer blend, as a recording layer, on one surface of a card substrate formed of an inactive resin or an alternative material. The recording layer covers either the entire surface area or only a selected area of the card substrate. When the polymer blend is shaped into a sheet in advance, the recording layer is formed on the card substrate by a suitable bonding method such as hot press-shaping, laminate extrusion, hot melting, ultrasonic welding or high-frequency welding. Such operation is carried out at an appropriately elevated temperature, which is usually in the range from 80° to 300° C. When the polymer blend is prepared by dissolving the raw material polymers in a suitable solvent, the recording layer can be formed by directly applying the solution to the card substrate by using a suitable coating method such as spin coating, flow coating, spraying or brushing. Also it is possible to use a film applicator. In selecting the solvent care should be taken not to dissolve or erode the card substrate.

Figure 2:
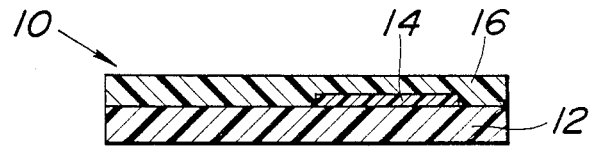

FIGS. 1 and 2 show an example of optical information recording cards according to the invention. In this recording card 10 a recording layer 14 of a polymer blend is formed only in a selected area of a card substrate 12. As shown in FIG. 2 the recording layer 14 is in direct and close contact with the front surface of the card substrate 12. The entire surface of the card substrate 12 including the recording layer 14 is closely covered with a transparent protective layer 16 (omitted in FIG. 1). The material of the protective layer 16 is a synthetic resin which is high in light transmittance, and preferably excellent in processability and printability, and is usually selected from polyvinyl chloride resins, acrylic resins, styrene resins and fluororesins.

In this card 10, information is recorded as microscopic pits 18 formed in the recording layer 14 by spotting with a semiconductor laser beam. The recorded information is read by utilizing a change in reflectance of the recording layer 14 at the pits 18.

A practicable range of the thickness of the recording layer 14 is from about 0.05 $\mu$m to about 30 $\mu$m, and a preferred range is from 0.5 to 10 $\mu$m. The thickness of the protective layer 16 is from about 5 $\mu$m to about 2000 $\mu$m. Considering sensitivities of the recording card 10 in writing and reading information, it is preferred to limit the thickness of the protective layer 16 within the range from 20 to 1000 $\mu$m.

Figure 3:
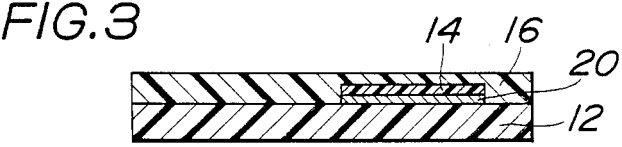
FIGS. 3 to 5 show three kinds of modifications of the recording part of the card of FIGS. 1 and 2, respectively, each in a sectional view corresponding to FIG. 2.

FIG. 3 shows a modification of the recording card of FIGS. 1 and 2. The sole point of modification is the addition of a reflective metal layer 20 which is closely interposed between the card substrate 12 and the back surface of the recording layer 14. The reflective metal layer 20 is included for the purpose of reading the recorded information by utilizing a change in light transmittance of the recording layer 14 at the pits 18 and detecting the change by receiving light reflected from the metal layer 20. The metal material of this layer 20 is not particularly limited, and it suffices to use an inexpensive metal such as aluminum. A suitable range of the thickness of the metal reflective layer 20 is from 0.02 to 1 $\mu$m, though the thickness can be increased up to about 2 $\mu$m without adverse influence except increase in cost.

The reflective metal layer 20 is formed, for example, by first preparing a sheet of a polymer blend selected as the recoridng material, then coating the back side of the polymer blend sheet with a reflective metal by a suitable technique such as vacuum deposition, sputtering or plating and finally welding or cementing the metal-cladded polymer blend sheet to the card substrate 12.

Figure 4:
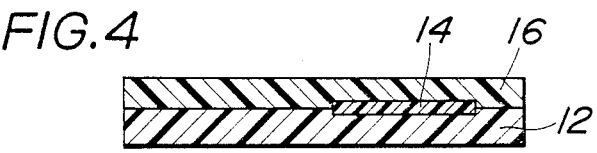
Figure 5:
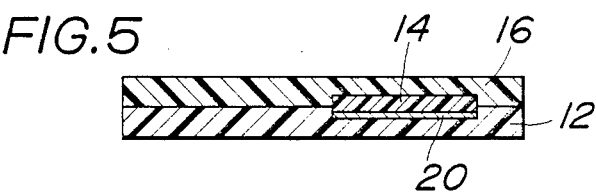

FIG. 4 shows another and minor modification of the recording card of FIGS. 1 and 2. In this case the recording layer 14 is partially buried in the card substrate 12. FIG. 5 shows a similar modification with respect to the card including the reflective metal layer 20 on the back of the recording layer 14.

The invention is further illustrated by the following nonlimitative examples.

EXAMPLES 1-6

In each of these examples a binary polymer blend was prepared for use as a recording layer material in an optical information recording card. The first component of the binary blend was either a copolymer of 70 wt% of VDF and 30 wt% of trifluoroethylene (TFE) or a copolymer of 90 wt% of VDF and 10 wt% of hexafluoroacetone (HFA). The second component was selected from polymethyl methacrylate (PMMA), polyethyl methacrylate (PEMA) and a copolymer of 50 wt % of methyl methacrylate (MMA) and 50 wt % of n-butyl acrylate (BA). The combinations of the first and second components in the respective examples were as shown in Table 1. In every example the binary polymer blend was prepared and formed into a thin sheet first by a solution casting method and next by a hot kneading mehtod.

In the first method, 25 parts by weight of the first component polymer and 75 parts by weight of the second component polymer were dissolved in methyl ethyl ketone so as to obtain a solution in which the total concentration of the polymers was 5 wt %. The solution was extended over a smooth surface of a glass plate, and the glass plate was left standing at room temperature under a dehumidified condition until complete evaporation of the solvent. As the result the desired binary polymer blend was obtained in the form of a thin sheet having a thickness of 10 $\mu$m. In every example the obtained polymer blend was subjected to measurement of light transmittance at various temperatures to determine the phase transition temperature from the manner of change in light transmittance with temperature. The result is shown in Table 1.

In the next method, 25 parts by weight of the first component polymer and 75 parts by weight of the second component polymer were mixed and kneaded at a suitably elevated temperature by using a planetary mixer. The obtained polymer blend was press-shaped into a sheet having a thickness of 10 $\mu$m. In every example there was no difference in phase transition temperature between the polymer blend obtained by the kneading method and the polymer blend obtained from solution.

TABLE 1

| First Component | Second Component | Phase Transition Temperature (°C.) |
| --- | --- | --- |
| Ex. 1 VDF-TFE copolymer | PMMA | 245 |
| Ex. 2 VDF-HFA copolymer | PMMA | 235 |
| Ex. 3 VDF-TFE copolymer | PEMA | 228 |
| Ex. 4 VDF-HFA copolymer | PEMA | 214 |
| Ex. 5 VDF-TFE copolymer | MMA-BA copolymer | 190 |
| Ex. 6 VDF-HFA copolymer | MMA-BA copolymer | 172 |

In each example an optical information recording card was produced by using the 10 $\mu$m sheet of the polymer blend as the recording material. The card substrate was a sheet of polyvinyl chloride resin. Using a hot press, the polymer blend sheet was welded to the card substrate by application of a pressure of 100 kg/cm$^2$ at 120° C. The recording layer formed by this operation was coated with a protective layer of a polyvinyl chloride resin by a solution coating method. In the thus produced information recording card the recording layer was 9 $\mu$m thick, and the protective layer was about 30 $\mu$m thick.

The recording cards produced in Examples 1-6 were subjected to an optical information recording test using a laser beam (wavelength 8300 Å) emitted from a laser diode. The testing equipment was adjusted such that the laser beam focussed at a power of 15 mW into a 3 $\mu$m spot on the recording layer of the card under testing, and the laser beam was pulsed to spot-heat the recording layer of the card. As the result, circular pits were formed in the recording layer of every card. In the cards of Examples 1 to 4 the pits had a diameter of 4 $\mu$m. In the cards of Examples 5 and 6 the pits had a diameter of 5 $\mu$m.

EXAMPLE 7

Another type of optical information recording cards were produced by using the 10 $\mu$m sheets of the binary polymer blends prepared in Examples 1 to 6.

First, aluminum was deposited by a vapor deposition method on one side of each polymer blend sheet so as to form a film having a thickness of 500 Å. Using a hot press the cladded polymer blend sheet was welded to the aforementioned card substrate such that the aluminum film made direct contact with and intruded into the card substrate. The recording layer provided by the welded polymer blend sheet was coated with a protective layer of a polyvinyl chloride resin by a solution coating method. In the thus produced information recording card the recording layer had a thickness of 9 $\mu$m and was backed with a reflective metal (aluminum) layer, and the protective layer was about 35 $\mu$m thick.

The recording cards produced in this example were subjected to the above described optical recording test using the 8300 Å laser beam. There was no change in the laser beam irradiation conditions. As the result, circular pits were formed in the recording layer of every card. In the cards using the polymer blends of Examples 1 to 4 the pits had a diameter of 4.5 $\mu$m. In the cards using the polymer blends of Examples 5 and 6 the pits had a diameter of 6 $\mu$m.

EXAMPLES 8-13

In each of these examples a ternary polymer blend was prepared for use as an optical information recording material. The first component of the ternary polymer blend was either the VDF-TFE copolymer used in the foregoing examples or the VDF-HFA copolymer used in the foregoing examples. The second component was selected from PMMA, PEMA and the MMA-BA copolymer used in the foregoing examples. The third component was always polyvinyl acetate (PVAc). The combinations of the three components in the respective examples were as shown in Table 2. In every example the three components were blended so as to obtain a ternary blend comprised of 20 wt % of the first component, 60 wt % of the second component and 20 wt % of the third component. In every example the polymer blend was prepared first by a solution casting method and next by a hot kneading method.

In the first method the selected three kinds of polymers were dissolved in methyl ethyl ketone so as to obtain a solution in which the total concentration of the polymers was 5 wt %. The solution was extended over a smooth surface of a glass plate, followed by drying as mentioned in Examples 1-6. As the result the desired ternary polymer blend was obtained in the form of a sheet 10 $\mu$m thick. In every example the phase transition temperature of the polymer blend was determined by the method described in Examples 1-6. The result is shown in Table 2.

In the next method the selected three kinds of polymers were mixed together and kneaded at a suitably elevated temperautre by using a planetary mixer, and the obtained polymer blend was press-shaped into a sheet 10 μm thick. In every example there was no difference in phase transition temperature between the polymer blend obtained by the kneading method and the blend obtained from solution.

TABLE 2

|  | First Component | Second Component | Third Component | Phase Transition Temperature (°C.) |
| --- | --- | --- | --- | --- |
| Ex. 8 | VDF-TFE copolymer | PMMA | PVAc | 152 |
| Ex. 9 | VDF-HFA copolymer | PMMA | PVAc | 145 |
| Ex. 10 | VDF-TFE copolymer | PEMA | PVAc | 146 |
| Ex. 11 | VDF-HFA copolymer | PEMA | PVAc | 138 |
| Ex. 12 | VDF-TFE copolymer | MMA-BA copolymer | PVAc | 136 |
| Ex. 13 | VDF-HFA copolymer | MMA-BA copolymer | PVAc | 126 |

In each example an optical information recording card was produced by using the 10 μm sheet of the ternary polymer blend as the recording material. Using a hot press, the polymer blend sheet was welded to a card substrate of polyvinyl chloride resin by application of a pressure of 200 kg/cm$^2$ at 100° C. After that the card surface was coated with a protective layer formed by a solution coating method using a polyvinyl chloride resin. In the thus produced information recording card the recording layer formed of the ternary polymer blend was 10 μm thick, and the protective layer was about 30 μm thick. In addition, another type of optical information recording card was produced in each example by first depositing a 500 Å thick aluminum film on one side of the 10 μm thick sheet of the ternary polymer blend and then welding the cladded sheet to the card substrate in the same manner as in Example 7. In the thus produced card the recording layer of the polymer blend was backed with a reflective metal (aluminum) layer.

The two types of recording cards produced in Examples 8 to 13 were subjected to the optical recording test using the 8300 Å laser beam. The test method and conditions were as mentioned in Examples 1-6 except that the laser beam power at the card surface was lowered to 10 mW. As the result, circular pits were formed in the recording layer of every card. In the cards of Examples 8 to 11, the diameter of the pits was 4 μm when no reflective metal was used and 4.5 μm when the reflective aluminum layer was incorporated. In the cards of Examples 12 and 13, the diameter of the pits was 4 μm when no reflective metal was used and 5 μm when the reflective aluminum layer was incorporated.

What is claimed is:

1. An optical information recording card comprising a card substrate and a recording layer provided on one side of the card substrate and covering at least a selected surface portion of the card substrate, said recording layer comprising a polymer blend capable of recording thermally written information, said polymer blend comprising a binary copolymer of 10-99 mol % of vinylidene fluoride and the balance of hexafluoroacetone as a first component and an acrylic or methacrylic ester polymer as a second component.

2. An information recording card according to claim 1, wherein said second component is selected from the group consisting of homopolymers and copolymers of methyl acrylate, methyl methacrylate, ethyl acrylate, ethyl methacrylate, n-propyl acrylate, n-propyl methacrylate, n-butyl acrylate and n-butyl methacrylate.

3. An information recording card according to claim 2, wherein the proportion of said first component of said polymer blend to said second component is in the range from 5:95 to 99:1 by weight.

4. An information recording card according to claim 1, wherein the thickness of said recording layer is in the range from 0.5 to 10 μm.

5. An information recording card according to claim 1, further comprising a reflective metal layer interposed between the card substrate and the recording layer.

6. An information recording card according to claim 5, wherein said reflective metal layer is formed of aluminum.

7. An information recording card according to claim 1, further comprising a transparent protective layer formed on said one side of the card substrate so as to cover at least the entire surface area of said recording layer.

8. An optical information recording card comprising a card substrate and a recording layer formed on one side of the card substrate and covering at least a selected surface portion of the card substrate, said recording layer comprising a polymer blend capable of recording thermally written information, said polymer blend comprising a vinylidene fluoride base polymer as a first component, an acrylic or methacrylic ester polymer as a second component, and a vinyl ester polymer as a third component.

9. An information recording card according to claim 6, wherein the amount of said third component of said polymer blend is not more than 70 wt % of the total of said first and second components.

10. An information recording card according to claim 8, wherein said vinyl ester polymer is selected from the group consisting of polyvinyl acetate, polyvinyl propionate, polyvinyl butyrate, polyvinyl caproate, polyvinyl caprylate, polyvinyl caprate, polyvinyl laurate and polyvinyl stearate.

11. An optical information recording card comprising a card substrate and a recording layer formed on one side of the card substrate so as to cover at least a selected surface area of the card substrate, said recording layer comprising a polymer blend capable of recording thermally written information, said polymer blend comprising a vinylidene fluoride base polymer as a first component selected from the group consisting of polyvinylidene fluoride and copolymers of vinylidene fluoride and at least one other fluorine-containing monomer selected from the group consisting of trifluoroethylene, tetrafluoroethylene, hexafluoroacetone, hexafluoroisobutene, chlorotrifluoroethylene, hexafluoropropene and vinyl fluoride, any of said copolymers comprising 10-99 mol % of vinylidene fluoride; an acrylic or methacrylic ester polymer as a second component selected from the group consisting of homopolymers and copolymers of methyl acrylate, methyl methacrylate, ethyl acrylate, ethyl methacrylate, n-propyl acrylate, n-propyl methacrylate, n-butyl acrylate and n-butyl methacrylate; and a vinyl ester polymer as a third component.

12. An information recording card according to claim 11 wherein the thickness of said recording layer is in the range from 0.5 to 10 μm.

13. An information recording card according to claim 11 further comprising a reflective metal layer which is interposed between the card substrate and the back side of said recording layer.

14. An information recording card according to claim 13, wherein said reflective metal layer is formed of aluminum.

15. An information recording card according to claim 11, further comprising a transparent protective layer formed on said one side of the card substrate so as to cover at least the entire surface area of said recording layer.

16. An information recording card according to claim 11, wherein the amount of said third component of said polymer blend is not more than 70 wt % of the total of said first and second components.

17. An information recording card according to claim 11, wherein said vinyl ester polymer is selected from the group consisting of polyvinyl acetate, polyvinyl propionate, polyvinyl butyrate, polyvinyl caproate, polyvinyl caprylate, polyvinyl caprate, polyvinyl laurate and polyvinyl stearate.

18. An optical information recording card comprising a card substrate and a recording layer provided on one side of the card substrate and covering at least a selected surface portion of the card substrate, said recording layer comprising a polymer blend capable of recording thermally written information, said polymer blend comprising a vinylidene fluoride base polymer as a first component and a acrylic or methacrylic ester polymer as a second component, and further comprising a reflective metal layer interposed between the card substrate and the recording layer.

19. An information recording card according to claim 18, wherein said reflective metal layer is formed of aluminum.

* * * * *